United States Patent [19]

Joannou

[11] 4,276,820
[45] Jul. 7, 1981

[54] AUTOMATIC EGG COOKER

[76] Inventor: Constantinos J. Joannou, 2008 Dorval Ave., Ottawa, Ontario, Canada, K1G 2N8

[21] Appl. No.: 884,995

[22] Filed: Mar. 9, 1978

[51] Int. Cl.³ .............................................. A47J 29/00
[52] U.S. Cl. ........................................ 99/334; 99/344; 99/440; 73/54; 426/231
[58] Field of Search ................. 99/331, 440, 344, 334; 73/54; 426/231

[56] References Cited

U.S. PATENT DOCUMENTS

| | | | |
|---|---|---|---|
| 3,181,348 | 5/1965 | Lewis | 73/54 |
| 3,382,706 | 5/1968 | Fitzgerald | 73/54 |
| 4,157,060 | 6/1979 | Avery | 99/331 |

Primary Examiner—Billy J. Wilhite

[57] ABSTRACT

This invention features an automatic egg cooker in which one of the eggs to be cooked is continuously tested for consistency by being placed in an oscillatory system. The magnitude and duration of oscillations due to an initial displacement of the system are measured. An alarm is set to ring when the desired consistency of the egg is reached.

8 Claims, 8 Drawing Figures

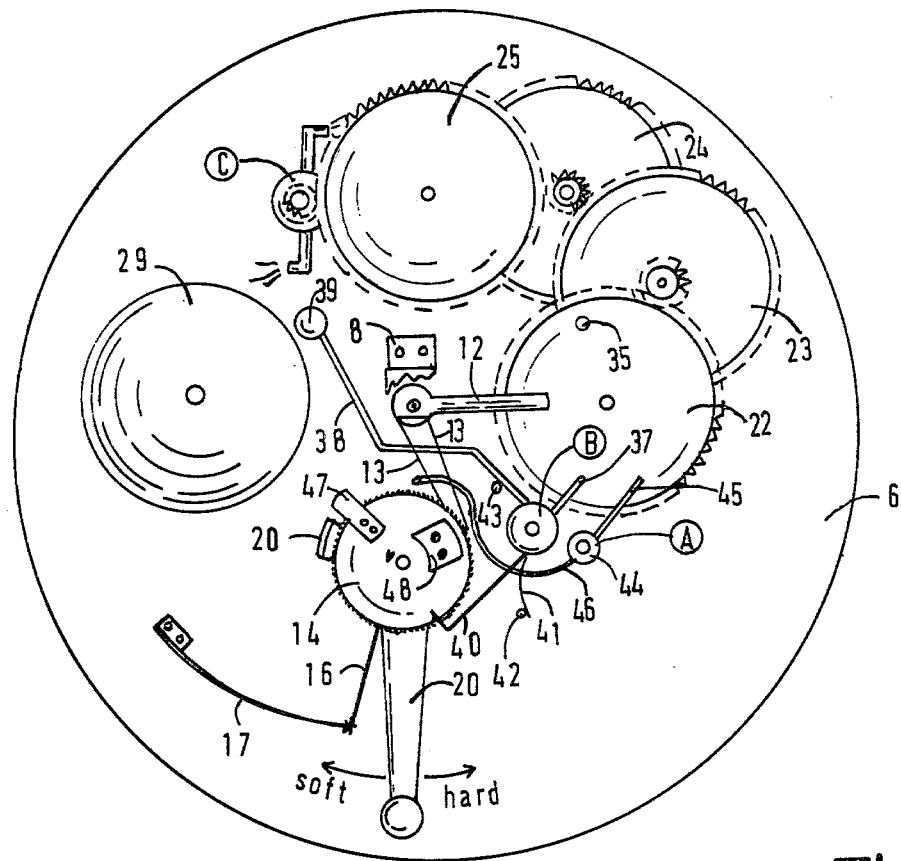
Fig. 2
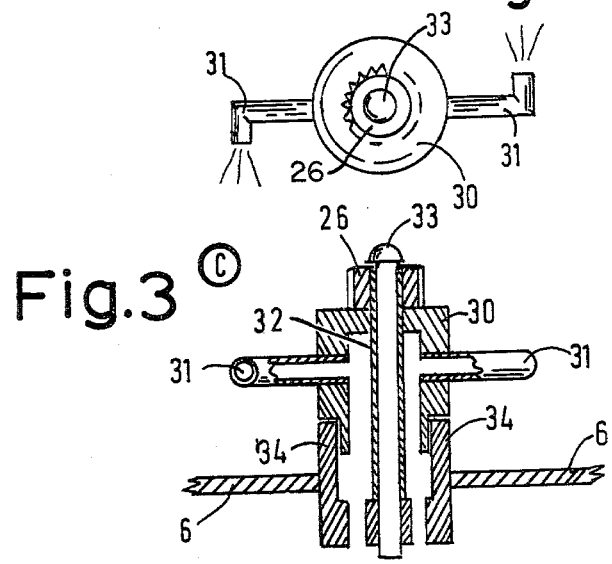
Fig. 3A
Fig. 3

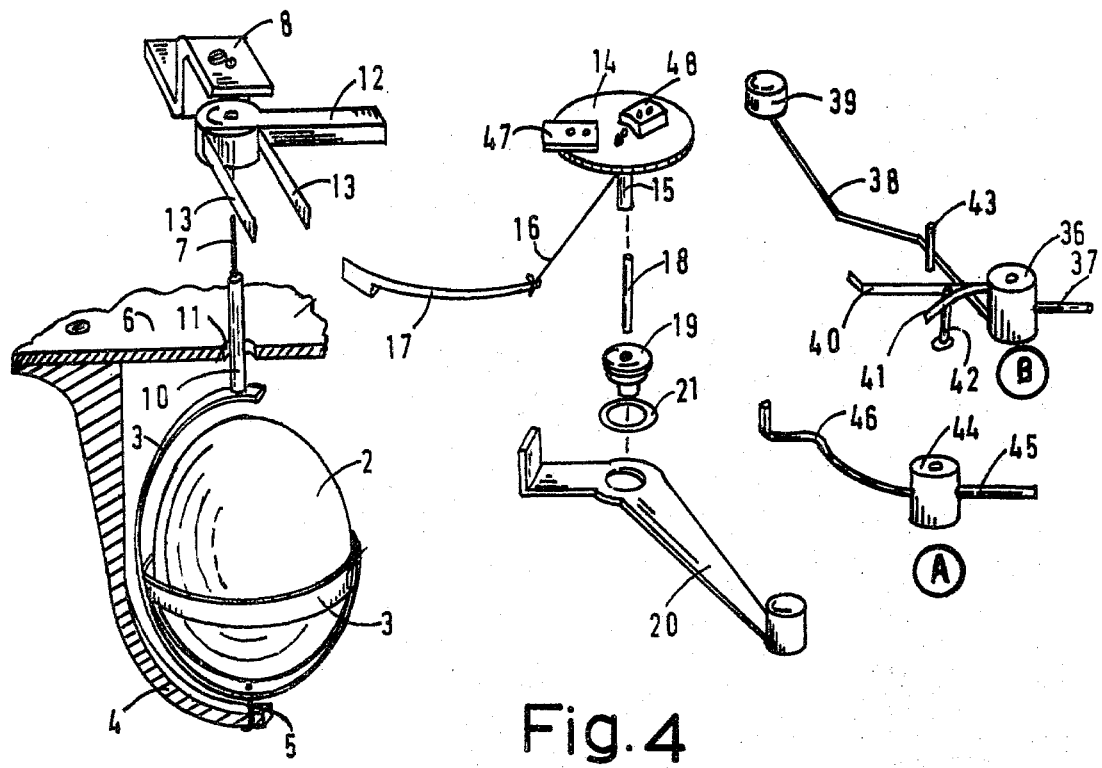
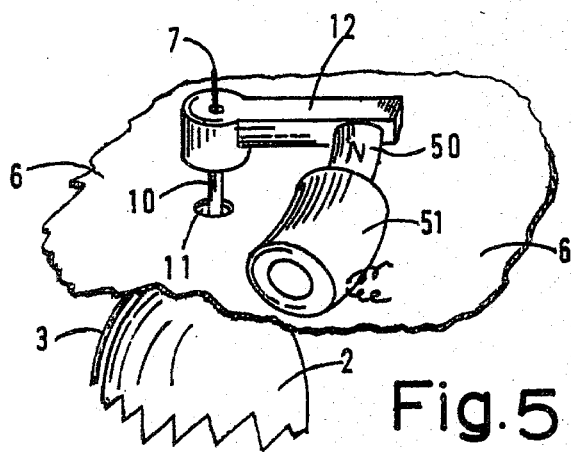
Fig. 4
Fig. 5

AUTOMATIC EGG COOKER

This invention provides an automatic steam cooker in which one of the eggs to be cooked is placed in a holder which is suspended by torsion springs thus forming a rotational inertia-spring system. The automatic mechanism continuously applies initial rotational displacement to this system and then measures and integrates the amplitude of oscillations. The total amplitude of oscillations is an indication of the consistency of the egg. The firmer the egg, the larger the amplitude of oscillations. This is due to the change of the damping ratio of the system. When the total amplitude reaches a pre-set amount, the cooker rings a bell or a buzzer.

In the present art of automatic egg cookers, the cookers do not sense the consistency of the eggs, but either ring a bell or remove the eggs from boiling water after a pre-set time. This is not satisfactory since the time an egg cooks depends on many factors, such as the amount of heat applied, how cold the egg was at the start, how old the egg is and its size.

It is the object of my invention to provide an egg cooker which senses the consistency of the egg inside without breaking it open and which rings an alarm when the egg reaches a preselected consistency. Another object of my invention is to provide an egg cooker which is self-contained and provides all the power required for the device from the steam generated in the cooker. Another object of my invention is to provide an egg cooker in which the testing and sensing of the egg consistency is done automatically. These and other objects of my invention will become apparent in the description and drawings which follow.

In drawings which illustrate embodiments of my invention,

FIG. 2 shows the mechanism by which the egg is tested, the steam turbine and the clockwork which operates the system;

FIG. 3 shows the details of the steam turbine;

FIG. 3A is a top view of FIG. 3;

FIG. 4 shows various key components in pictorial form;

FIG. 5 shows the solenoid and magnet arrangement as used in the electronically controlled cooker;

Figure 1:
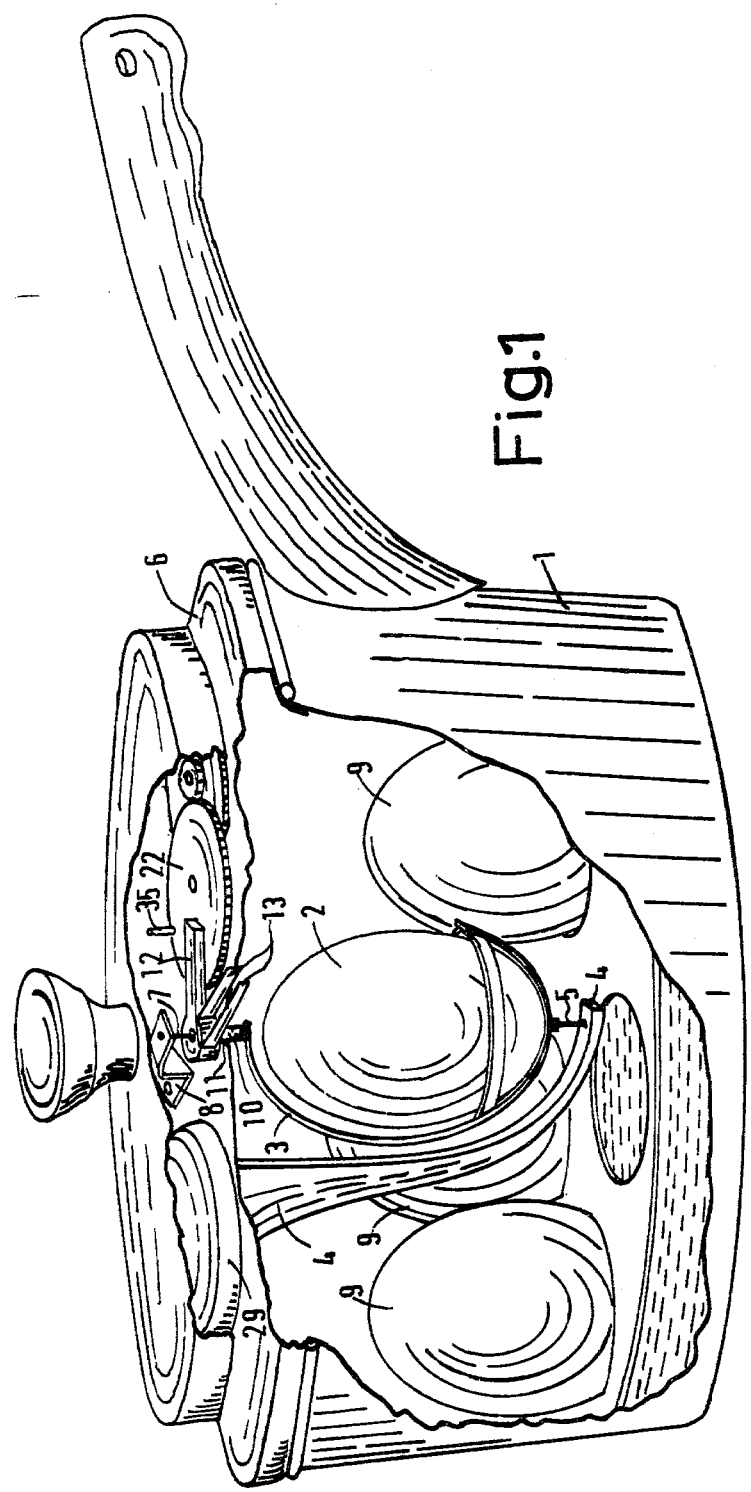
FIG. 1 is a cross-sectional view of the cooker, the egg being tested in the holder and the other eggs.

In FIG. 1, 1 is the container pot shown in segmented pictorial view. 2 is one of the eggs which is placed in egg holder 3; 4 is an egg holder support which supports the egg holder at the lower end via torsional spring wire 5. The upper end of the holder is supported on lid 6 via torsional spring wire 7 and bracket 8 (See also FIG. 4). Bracket 8 is fixed to the lid. 9 are the other eggs in the cooker which are placed in a tray with holes in it. A tube 10 is attached to the upper end of egg holder 3 and surrounds wire 7. Wire 7 passes through tube 10 and is also attached to the upper part of egg holder 3 at the bottom of tube 10. Tube 10 passes through the lid via a hole 11 which is slightly larger than the outside diameter of tube 10 and thus tube 10 does not touch the lid. Member 12 is provided with a hole at one side and is press fitted over tube 10. Flat spring members 13 are also attached to member 12 at a point near tube 10. Springs 13 are both bent to one side and they exert a force on toothed wheel 14 and thus form a ratchet arrangement so that when the egg holder oscillates, toothed wheel 14 rotates. Wheel 14 has a sleeve bearing 15 which is fixed to it. A flexible string 16 is attached at one end near the centre of wheel 14 and at the other end to one end of flat spring element 17. The other end of spring 17 is fixed to the lid. When wheel 14 rotates, string 16 winds on bearing 15. Bearing 15 is rotatably supported by pin 18 which is fixed to the lid by pin holder 19. Holder 19 also holds controlling lever 20 onto the lid, but allows it to rotate. Spring washer 21 provides friction for the adjusting lever. The rest of the mechanism consists of a clockwork comprising gears 22, 23, 24 and 25, the steam turbine C, a reset sub-assembly A, a bell hammer sub-assembly B and a bell 29.

Construction of the turbine sub-assembly C is shown in FIG. 3. It consists of an upper hollow rotating member 30 to which two pipes 31 are attached. Pipes 31 are bent by 90 degrees at their outer ends to form jets which provide the torque. Sleeve bearing 32 is press fitted into a hole at the top of member 30 and is free to rotate on shaft 33. Shaft 33 is fixed to the lower and stationary part of turbine member 34. Sleeve bearing 32 also supports spur gear 26 at the top of the turbine. Member 34 is press fitted onto the lid and has holes underneath for the steam to go through. Turbine C provides power to the system via gear train 25, 24, 23 and 22. Gear 22 is provided with a peg 35. Peg 35 is arranged to come in contact with member 12 and sub-assemblies B and A.

Sub-assembly B consists of a pivoted cylindrical member 36. Rigid wire 37 protrudes from the side of member 36. Semi-rigid wire 38 is also attached to member 36 and at its end a weight 39 is attached to form the hammer for ringing bell 29. Two flat spring members are also attached to member 36, one spring 40 is a stiff spring and the other spring 41 is a weaker spring. Spring 41 rests on peg 42 which is fixed to the lid. Spring 41 tends to rotate the whole sub-assembly B counterclockwise. This causes wire 38 to press against peg 43. In this position hammer 39 is near bell 29 but does not touch it.

Sub-assembly A consists of pivoted cylindrical member 44 on which rigid wires 45 and 46 are attached at opposite sides. Wire 46 is bent upwards at its free end. The purpose of this assembly is to lift springs 13 off wheel 14 and reset the measuring mechanism when peg 35 on wheel 22 pushes against wire 45.

Operation of the egg cooker is as follows: One of the eggs to be cooked is placed on the egg holder, the pot is filled with a small quantity of water and the lid is placed on the pot. The lid fits tightly on the pot so that a small amount of steam pressure develops when the water boils. The steam passes through the holes of member 34 of the turbine and through turbine tubes 31, thus setting the turbine in rotation which, in turn, rotates the rest of the gears. This starts a cycle of vibrating the egg holder and egg, measuring the total amplitude of all oscillations, ringing the bell when the sum of all amplitudes reaches a predetermined point and resetting the mechanism.

This is done as follows: Peg 35 on gear 22 pushes member 12 to one side, causing it to rotate partly in the clockwise direction (See FIG. 2). After peg 35 rotated beyond the reach of member 12, member 12 is released and the egg holder 3 and egg 2 is set in oscillatory rotational motion due to the moment of inertia of the egg and the torsion provided by spring wires 5 and 7. While the egg holder, egg and member 12 are oscillating, flat springs 13 push alternately on toothed wheel 14 which, due to the ratchet effect, rotates in a clockwise direction. The total amount of rotation of wheel 14 is proportional to the sum of all the peak amplitudes of all the oscillations. If the egg is raw and in liquid form, the oscillatory system is heavily damped, the oscillations die down fast and the rotation of wheel 14 is small. If, however, the consistency of the egg is firm, the system is less damped, the oscillations last longer and wheel 14 will turn farther. Next, peg 35 pushes on wire 37 and causes sub-assembly B to rotate slightly clockwise. When peg 35 rotates beyond the reach of wire 37, sub-assembly B is released and, due to spring action of spring 41 pressing against peg 42, sub-assembly B will return to its original position and wire 38 will rest on peg 43; but, because spring 41 is a weak spring, hammer 39 will not ring the bell. If, however, wheel 14, due to larger oscillations of the egg, rotated to the point where protrusion 48 on wheel 14 came to rest under spring 40, then, when sub-assembly B is released, it will return to its original position with greater velocity. In this case, because of flexure of wire 38, the hammer will hit the bell. Next, peg 35 pushes against wire 45 and causes sub-assembly A to rotate slightly clockwise. This causes wire 46 to push springs 13 away from wheel 14. When this happens, wheel 14 will turn counterclockwise due to the action of spring 17 and string 16. While wheel 14 was turning clockwise, string 16 was winding on sleeve 15 against the force provided by spring 17. Wheel 14 will keep turning counterclockwise until protruding member 47 comes to rest on the vertical part of controlling lever 20. The amount of rotation of wheel 14 required to cause the bell to ring depends on the position of controlling lever 20. If lever 20 is set in a more counterclockwise position, wheel 14 will have to rotate farther before the bell rings. For this to happen, the consistency of the egg must be firmer. The opposite will happen if lever 20 is set in a more clockwise position. Thus the position of lever 20 determines how firm the egg has to be before the bell will ring.

Although in the above described device the oscillation, measurement and reset cyclic process was achieved by the clockwork mechanism driven by a steam turbine, the same process can be achieved by having the clockwork driven by a mainspring, electric motor or any other source of mechanical power.

Figure 6:
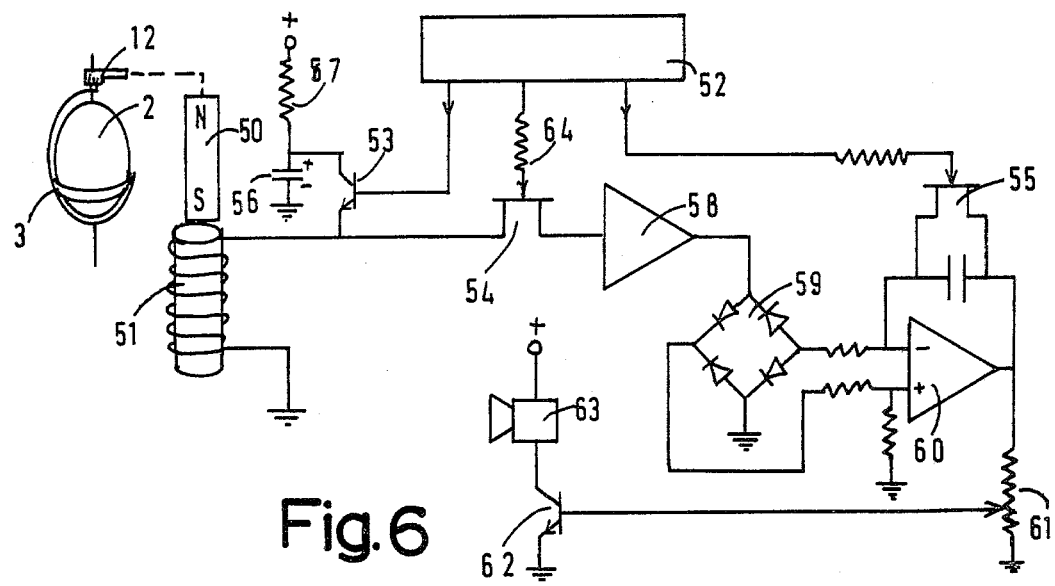
FIG. 6 shows the circuit in block diagram form of the electronically controlled cooker.

In another version of the device, the egg oscillation, measurement and reset cycle is done electronically (See FIGS. 5 and 6). In this case, member 12 has a magnet 50 attached to it which is curved and fits into a curved solenoid 51 which is fixed to the lid. The radius of curvature of magnet 50 and solenoid 51 is equal to the distance from the point of attachment of magnet 50 to the centre of rotation of member 12. Member 12 and magnet 50 are free to oscillate because magnet 50 does not touch the inside surface of solenoid 51.

In FIG. 6, block 52 represents timing circuits which apply pulse voltages of various duration first to transistor 53, then to field effect transistor 54 and then to field effect transistor 55. This process repeats cyclically. When a short first pulse is applied to the base of transistor 53 momentarily, capacitor 56, which is originally charged via resistor 57, discharges through solenoid 51, thus providing an impulse torque to the egg, holder and torsion wire system as before. The system oscillates and magnet 50 induces an AC voltage is solenoid 51. Immediately after the first pulse elapsed, a second pulse of much longer duration is applied to the gate of transistor 54 via resistor 64. This pulse turns transistor 54 on and connects solenoid 51 to amplifier 58. Amplifier 58 amplifies the alternating voltage produced by solenoid 51. The output voltage from amplifier 58 is full-wave rectified by bridge rectifier 59 and is applied to integrating amplifier 60. The output of integrator 60 is a voltage of which the magnitude is proportional to the area under the curve of the waveform produced by rectifier 59. Therefore, this voltage is proportional to the total sum of all the oscillations produced by the egg, holder and spring system. Control potentiometer 61 divides down the output voltage from integrator 60 and applies it to the base of transistor 62, thus providing base current. Transistor 62 drives alarm unit 63 which sounds an alarm when the base current in transistor 62 reaches a certain level.

In operation, control 61 is set for the desired consistency of the eggs being cooked. If control 61 is set with the wiper near the ground connection, a higher voltage will be required out of integrating amplifier 60 to provide sufficient base current to transistor 62 to operate the alarm. This condition will occur when the egg is quite firm in consistency. If the wiper of control 61 is set to the other end of the potentiometer, a softer egg will cause the alarm to ring. This last version of the egg cooker is particularly suited for incorporation into an electric cooker which is electrically heated by an element at the bottom of the pot.

Figure 7:
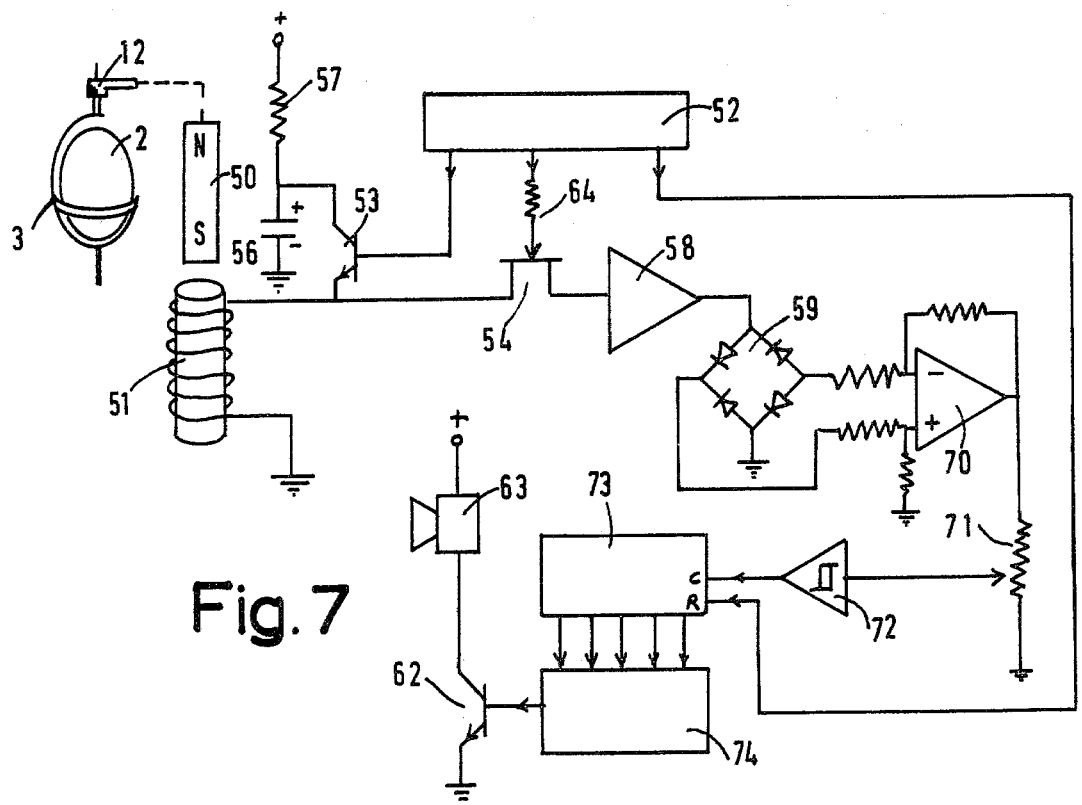
FIG. 7 shows another arrangement of the system of FIG. 6 in which the number of oscillations is counted.

Another method of testing the egg for consistency is to place it in an oscillatory system and set it oscillating, as before, and count the number of oscillations exceeding a pre-set amplitude. This can be achieved by slight modification to the system shown in FIG. 6. FIG. 7 shows the modified circuit. The output of rectifier 59 is applied to amplifier 70. The amplified full-wave rectified signal is applied to potentiometer 71 which sets a threshold. The divided down signal from potentiometer 71 is fed to Schmitt trigger 72 which converts the signal into pulses. These pulses are fed to counter 73 where they are counted. The number registered in counter 73 is decoded by decoder 74 which is set to provide a voltage to transistor 62 when a certain number in counter 73 is decoded, and this rings alarm 63. Counter 73 is reset by the timing circuits of block 52 at the end of each cycle of operation. In this system, the alarm is set to ring at the desired consistency either by adjusting threshold potentiometer 71 or by setting decoder 74 to activate the alarm circuits when a certain number is registered in the counter. Setting the wiper of potentiometer 71 near the ground connection will require the oscillations of the egg to keep greater amplitudes for longer time in order for the alarm to sound. This means that the egg has to be firmer. The same can be achieved by setting decoder 74 to produce an output to transistor 62 when a greater number of counts is registered in counter 73.

It is possible to cook poached eggs in the egg cooker by providing small trays in which the contents of the eggs can be placed. The trays can be put in the egg cooker in place of the whole eggs. One tray is placed in the egg holder. By providing these trays, the egg cooker becomes more versatile.

What I claim is:

1. A device for cooking eggs comprising a pot, a lid and an egg holder in which an egg can be placed, torsion spring means being attached to said lid and said egg holder so as to suspend the egg holder from the lid so that said egg holder and said egg are free to oscillate;

steam operated means to cause said egg holder to oscillate, a mechanism for measuring the total travel undergone by said egg holder and said egg any time said egg holder is made to oscillate, said mechanism being located on said lid; an alarm mechanism which is arranged to sound an alarm when said total travel undergone by said egg holder exceeds a pre-set amount of travel, said alarm mechanism also being located on said lid.

2. A device for cooking eggs as described in claim 1 in which said mechanism for measuring said total travel undergone by said egg holder any time said egg holder and said egg are made to oscillate is a ratchet comprising two pawls attached to said egg holder and a ratchet wheel rotatably attached to said lid and arranged to turn said ratchet wheel unidirectionally in proportion to said total travel undergone by said egg holder and in which said alarm mechanism comprises a bell, a bell hammer, a cam and clockwork, said cam being attached to said ratchet wheel and being arranged so that when said ratchet wheel and said cam have rotated by a preset amount of angular rotation, said clockwork is made to operate said bell hammer and said bell hammer is made to strike said bell, said steam operated means being a steam turbine and said turbine being operated by steam generated in said pot said clockwork being driven by said steam turbine, said turbine being constructed of a hollow pipe rotatably attached to said lid, said pipe having at least two nozzles protruding from its sides so that when steam generated in said pot passes through said pipe and said nozzles torque is produced by said nozzles and said pipe is made to rotate.

3. A device as described in claim 1 wherein said steam operated means is a steam turbine located on said lid and in which said egg holder and said egg are made to oscillate with power provided by said steam turbine, and said steam turbine being constructed of a hollow pipe rotatably attached to said lid, said pipe having at least two nozzles protruding from its sides so that when steam generated in said pot passes through said pipe and said nozzles torque is produced by said nozzles and said pipe is made to rotate.

4. A device for cooking eggs as described in claim 1 in which said mechanism for measuring said total travel undergone by said egg holder any time said egg holder and said egg are made to oscillate comprises a permanent magnet attached to said egg holder, a stationary solenoid affixed on said lid and partly surrounding said magnet and an electronic system which amplifies, rectifies and integrates an AC voltage induced by the movement of said magnet into said solenoid said integrated voltage being a measure of said total travel of said egg holder when said egg holder and said egg are set into oscillations said integrated voltage being used to turn an alarm device on when said integrated voltage exceeds an adjustable threshold.

5. A device for cooking eggs as described in claim 1 in which said mechanism for measuring said total travel undergone by said egg holder and said egg any time said egg holder and said egg are made to oscillate comprises a permanent magnet attached to said egg holder, a stationary solenoid attached to said lid and partially surrounding said magnet, an electronic system comprising an amplifier which amplifies an AC voltage induced into said solenoid by said magnet and a counter which counts the number of oscillations of said AC voltage after it has been amplified said electronic system being so arranged that when the number registered by said counter exceeds a pre-set number, an alarm device is turned on.

6. A device for cooking eggs comprising a pot, a lid and an egg holder in which an egg can be placed, torsion spring means being attached to said lid and said egg holder so as to suspend the egg holder from the lid, electromechanical mechanism comprising a permanent magnet attached to said egg holder and a stationary solenoid attached to said lid and partly surrounding said magnet and passing a pulse of electric current through said solenoid to cause said egg holder to oscillate, a mechanism for measuring the total travel undergone by said egg holder and said egg any time said egg holder is made to oscillate, said mechanism being located on said lid; an alarm mechanism which is arranged to sound an alarm when said total travel undergone by said egg holder exceeds a pre-set amount of travel, said alarm mechanism also being located on said lid.

7. A device for cooking eggs as described in claim 1 in which said lid comprises an enclosed compartment in which said mechanism for measuring said total travel undergone by said egg holder and said alarm mechanism are enclosed.

8. A device for cooking eggs as described in claim 1 in which said lid fits onto said pot airtightly so that steam pressure can be generated inside said pot.

* * * * *